April 21, 1964

E. E. DARGAN ETAL 3,129,733

MACHINE FOR FORMING A CYLINDRICAL BILLET WITH
A PLANE SURFACE SUBSTANTIALLY PARALLEL
TO THE BILLET AXIS

Filed Feb. 5, 1962

INVENTORS
ERVIN E. DARGAN
WILLIAM A. BARBER

BY Watson, Cole, Grindle & Watson
ATTORNEYS

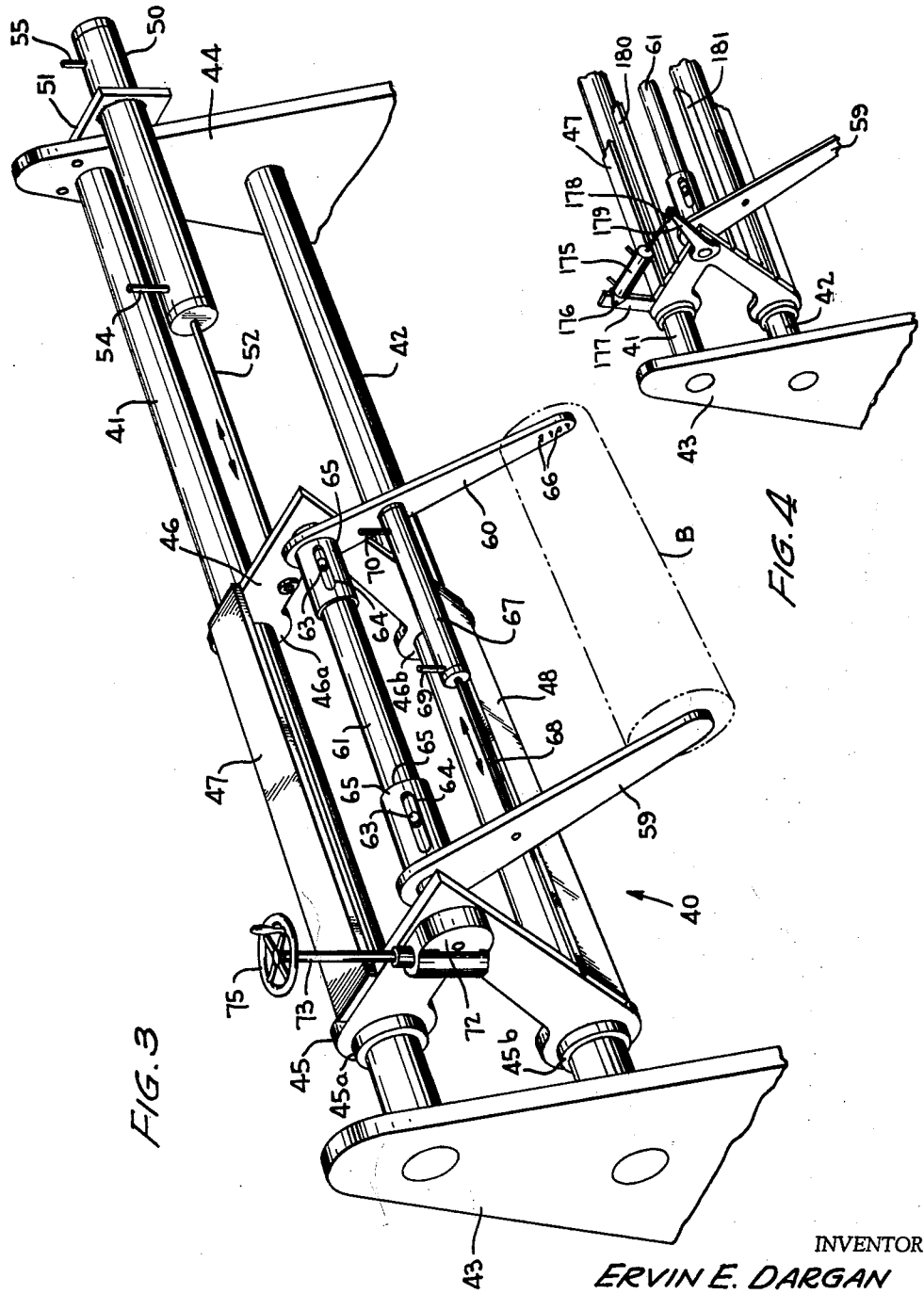

United States Patent Office 3,129,733
Patented Apr. 21, 1964

3,129,733
MACHINE FOR FORMING A CYLINDRICAL BILLET WITH A PLANE SURFACE SUBSTANTIALLY PARALLEL TO THE BILLET AXIS
Ervin E. Dargan, Conway, and William A. Barber, Myrtle Beach, S.C., assignors, by mesne assignments, to The Terrell Machine Company, Charlotte, N.C., a corporation of North Carolina
Filed Feb. 5, 1962, Ser. No. 171,019
2 Claims. (Cl. 143—117)

This invention relates to improvements in a woodworking machine of the type adapted for cutting a slab from a rough log or billet.

It is a primary object of the invention to provide such a machine, which is adapted to provide the billet with a plane surface substantially parallel to the cylindrical axis of the billet whereby such plane surface may serve as a reference plane for subsequently positioning the billet for relative axial feeding movement with respect to further cutting tools, whereby the cuts subsequently taken by such tools will extend parallel to the axis or heart of the billet.

It is a further object to provide such a woodworking machine, which is relatively simple in its construction and operation and which will, nevertheless, function to automatically position a billet with its axis parallel to the cutting plane of a saw or the cutting tool, and thereafter to accurately feed said billet past the cutting tool, while maintaining its said position with respect to the cutting plane of the tool.

In order to achieve the foregoing objects and advantages, the invention utilizes a novel work positioner fixedly disposed on the infeed side of a cutting tool, such as a circular saw, adapted to take a cut in a predetermined cutting plane. The billet positioner is adapted by virtue of its special shape to automatically position a billet received therein with the cylindrical axis of the billet parallel to the cutting plane of the saw, the positioner being fixedly positioned with respect to the saw to this end, and also being so disposed that the cutting plane of the saw chordally intersects the billet thus positioned.

A feed carriage disposed for operative movement from abreast of the work positioner through a feeding stroke past the saw and parallel to the cutting plane thereof, is adapted to take the billets one by one from the positioner, and while maintaining them with their axes in the same fixed relation to the cutting plane of the saw as above mentioned, to feed them into operative engagement with the saw or other cutting tool whereby to provide the desired chordal plane or reference surface along one side of each log or billet.

In accordance with the invention, the work positioner above mentioned, assumes a special form of quite simplified construction, comprising a pair of upwardly diverging plates or elements having supporting plane surfaces intersecting along a line parallel to the vertical cutting plane of the saw and both diverging upwardly at equal angles to a vertical plane extending through their line of intersection.

For automatically feeding a plurality of billets in succession into such positioning means, there may be provided an inclined feed chute communicating with the upper edge of one of said inclined plates or surfaces of the positioner.

The carriage which takes the billets successively from the positioner and feeds them past the cutting tool and into operative engagement therewith, is provided with billet gripping members adapted to maintain the billets in identical relation with the cutting plane of the saw as determined by the positioner, and to disengage and release the billets after the feeding stroke has been completed. In order that the said gripping members may clear a billet disposed in the positioner on the return stroke of the carriage, the said members are preferably retractable to positions such as will enable them to pass clear of such a billet.

The foregoing and other features and objects of the invention will be readily apparent from the following description of the preferred embodiment of the invention, in conjunction with the accompanying drawings in which:

FIGURE 3 is an enlarged perspective view of a portion of the mechanism including particularly the feed carriage and its guiding and actuating mechanisms.

FIGURE 4 is a fragmentary view similar to FIGURE 3 showing a modified arrangement of mechanism for raising and lowering the billet gripping members.

Figure 1:
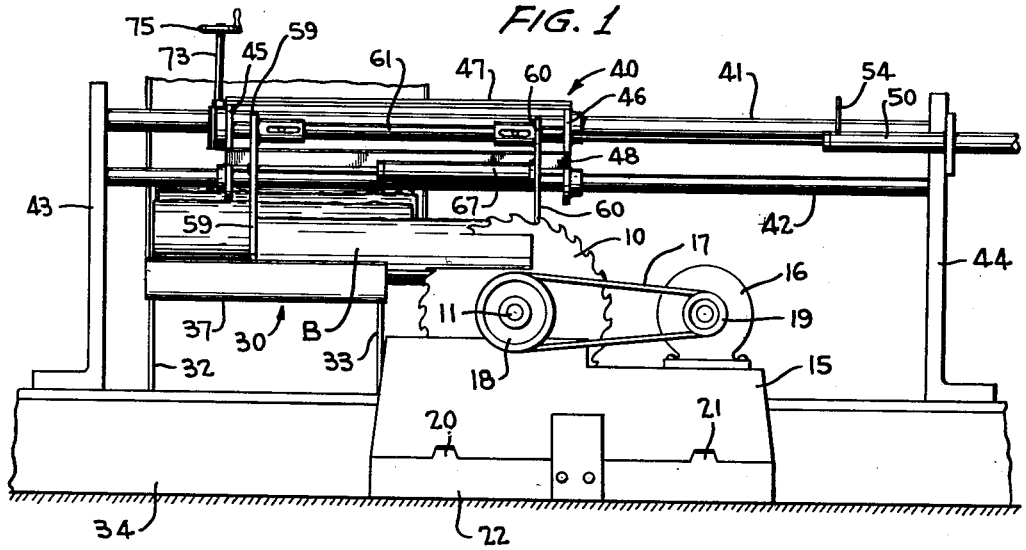
FIGURE 1 is a side elevation of a woodworking machine in accordance with the invention showing the parts in their operative relations at the beginning of the feed stroke wherein the saw has commenced its cutting engagement with a billet.
Figure 2:
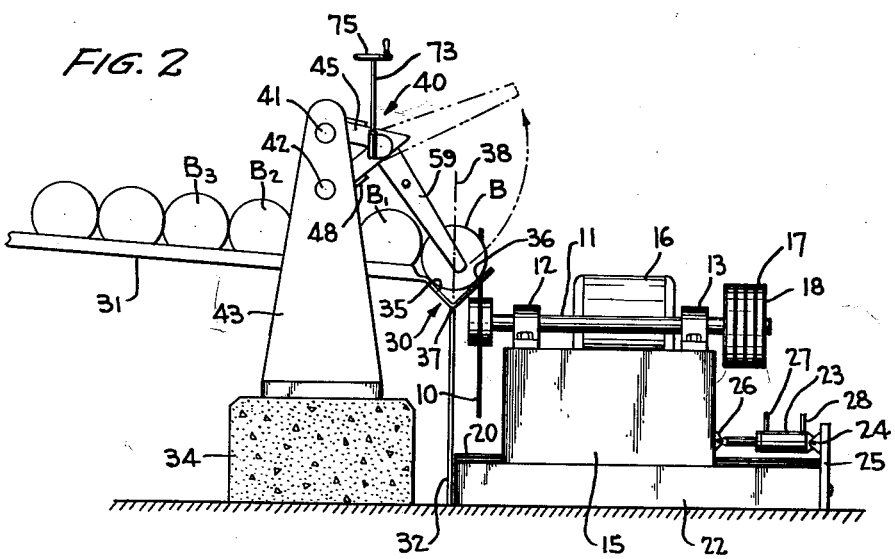
FIGURE 2 is an end elevation of the structure shown in FIGURE 1 with the parts in the operative relationships there shown and further showing in broken lines the raised or retracted positions of the billet gripping members.

Referring now in detail to the accompanying drawings, the numeral 10 in FIGURES 1 and 2 designates a cutting tool, which in the preferred embodiment assumes the form of a circular saw disposed for cutting in a predetermined cutting plane. In the present instance, it will be seen that the cutting plane is coincident with the plane of the saw 10 itself. The saw 10 is rotatably supported and keyed on a shaft 11 and journaled through bearings 12 and 13 on a support 15. The saw, as thus supported, is driven by a suitable electric motor 16 through flexible belts 17 operatively disposed about sheaves 18 and 19 respectively keyed on the shafts of the saw and the motor.

Inasmuch as it will be desirable at times to vary the position of the cutting plane of the saw 10 to adapt it for coaction with billets of varying diameters, it is desirable to provide for this, as by forming the support 15 as a slide mounted on guide tracks or rails 20 and 21 on a suitable supporting base 22. The rails extend parallel to the rotational axis of the saw as defined by its shaft 11, and thus support the saw for movement parallel to its shaft and perpendicularly to the cutting plane of the saw. Adjustment of the slide 15 may be achieved through selective actuation of a hydraulic or pneumatic ram or jack 23 of a conventional double acting type having its cylinder portion connected as at 24 to an upstanding support 25 secured to the base 22. Its opposite end or piston rod is similarly connected as at 26 to the slide 15. Actuating fluid may be supplied to and withdrawn from the cylinder 23 through conduits 27 and 28 shown fragmentarily in FIGURE 2, under the control of a usual reversing valve (not shown).

For initially receiving and accurately automatically positioning billets for feeding into operative engagement with the saw 10, there is provided a billet positioner, generally designated 30, which is fixedly supported on the infeed side of the saw 10. By reference to FIGURES 1 and 2, it will be noted that the positioner 3 of the preferred embodiment is fixedly supported by, and at one end of, an inclined feed chute 31 adapted to deliver billets to the positioner in succession by the action of gravity each time a billet is taken from the positioner 30 and fed to the saw 10. The chute 31 is fixedly positioned in any suitable manner to thus maintain the fixed relationship between the positions of the positioner 30 and the saw 10. In the preferred embodiment suitable supporting means for the chute 31 may comprise the frame members 32 and 33 affixed to and projecting upwardly from the base member 34.

The billet positioner 30 is formed in any suitable manner to provide upwardly diverging plane surfaces 35 and 36 intersecting along a line 37 parallel to the cutting plane of the saw 10. In the present embodiment, these surfaces 35 and 36 are defined by integral portions of a metal plate bent into the desired V-shaped configuration and arranged with the upper edge of the plate section 35 constituting an integral extension of the bottom of the chute 31. It is important that these converging surfaces 35 and 36 be at equal angles of inclination with respect to, or in other words that the included angle between 35 and 36 be bisected by a vertical plane indicated by the broken line 38 in FIGURE 2, which plane includes the line of intersection 37 between the surfaces 35 and 36. With this arrangement, it will be obvious that a cylindrical billet B received in the positioner, as shown in FIGURE 2, will inherently be positioned with its cylindrical axis in the same vertical plane 38, and thus parallel to the cutting plane defined by the saw plane 10 as seen in FIGURE 2. Since the positioner 30 is located on the infeed side of the saw blade 10, it will be quite apparent that it may extend across the cutting plane defined by the saw blade in the manner shown in FIGURE 2 without in any way contacting or interfering with the saw.

For taking the positioned billets successively from the positioner 30 and feeding them into operative engagement with the saw 10 while preserving the fixed relationship between the billet axis and the cutting plane of the saw as initially determined by the positioner 30, the invention includes a feed carriage of special construction, generally designated by the numeral 40, and illustrated in detail in FIGURE 3. It will be seen that the carriage 40 is suitably guided on the rods or rails 41 and 42 respectively, which, in turn, are fixedly supported between the relatively spaced frame members 43 and 44, both of which are secured to the supporting base 34.

The carriage 40 in the form illustrated in the accompanying drawings, comprises a pair of similar but symmetrically disposed end members 45 and 46, each of which is provided with bushing or bearing portions 45a, 45b and 46a, 46b respectively, receiving and slidably supporting it on the guides 41 and 42. These end members 45 and 46 are rigidly interconnected by the longitudinal members 47 and 48 respectively to define a rigid unitary carriage frame. The rails 41 and 42 thus provide means supporting the carriage 40 and guiding it for operative movement from a fully retracted position on the left hand or infeed side of the saw 10, as seen in FIGURE 1, through a feed stroke past the saw 10 and a return stroke back to its retracted position. For causing such feeding and return strokes, power means may be provided as exemplified by the pneumatic cylinder 50 fixedly supported on the frame upright or standard 44 as by means of a bracket 51. The piston rod 52 of the conventional piston within the cylinder 50 has its free end fixedly connected to the end member 46 of the carriage as shown. Preferably the cylinder 50 is of the double acting type, having fluid admission and exhaust conduits shown fragmentarily in FIGURE 3 at 54 and 55 respectively. These conduits 54 and 55 are arranged in each case to act either as intake or exhaust means located at opposite ends of the cylinder 50, whereby under the control of a conventional reversing valve (not shown), fluid may be selectively admitted to the cylinder through either of the conduits 54 or 55 and withdrawn through the other.

For engaging and supporting the successive billets B, B₁, B₂, etc. during feeding movement of the carriage 40, there are provided on the carriage a pair of gripping arms 59 and 60 respectively, which are spaced apart on a supporting shaft 61 rockably supported between the carriage end members 45 and 46. The arms 59 and 60 are disposed for relatively sliding or axial movement on the supporting shaft 61 toward and away from each other, whereby they may be moved into and from gripping engagement from the opposite axial ends of a billet B, but are, nevertheless, slidably keyed on the shaft 61, as by the studs 63 fixed to the shaft 61 and each slidably received in a keyway 64 opening through the cylindrical hub 65 of its respective arm.

It will be seen that the rock shaft 61 extends in a direction parallel both to the guide rails 41 and 42, as well as to the vertical plane 38, and the cutting plane defined by the saw blade 10. Thus the movement of the carriage 40, and also the relative movements of the gripping members 59 and 60 will be in directions parallel to the cutting plane of the saw 10. Normally, the length of the arms 59 and 60 will be such that when they are operatively positioned in engagement with a billet, as shown in FIGURE 2, their free ends will be clear of the saw and will not project across the cutting plane thereof.

For supporting the opposite axial ends of the billet B between the gripping members 59 and 60 and against both rotational and translational displacement from the position determined by the positioner 30, the free end portions of these arms or members 59 and 60, are preferably provided on their relatively opposed faces with a plurality of studs or points such as are designated 66 in FIGURE 3, to thus penetrate into the ends of the billet for a slight distance when the members 59 and 60 are urged into gripping engagement with the billet. Such gripping engagement, as well as disengagement of the members 59 and 60 may be produced as desired by means of a double acting piston and cylinder structure such as 67 having its cylinder portion connected in fixed relation to one arm 60 and its piston rod 68 fixedly connected at its relatively remote end to the member 59. In this instance, also the piston and cylinder structure is preferably of the double acting type in which the actuating fluid may be admitted into or withdrawn from either end of the cylinder 67 through the fragmentarily shown conduits 69 and 70, under the control of a conventional reversing valve not shown.

It is desirable that the gripping members 59 and 60 be fixedly maintained in their positions in operative gripping engagement with the billet B throughout the feeding movement of the billet past the saw 10, so that during the entire feeding movement the relationship of the axis of the billet to the cutting plane of the saw 10 will remain unchanged over said position as determined by the positioner 30. At the same time, it will be apparent that once a billet is removed from the positioner 30 by feeding movement of the carriage 40, one of the relatively adjacent billets B₁, B₂, B₃, etc. supported in the chute 31 will be caused by gravity to immediately take its place. Thus, on the return movement of the carriage it is necessary that the members 59 and 60, and more particularly the former be movable to a retracted position as indicated, for instance, by the broken lines in FIGURE 2, wherein the succeeding billet B₁ thus positioned within the positioner element 30 will not interfere with them on the return movement of the carriage.

To these several ends, the shaft 61 to which the members 59 and 60 are secured against rotation by the stud and slot connections 63 and 64, will be selectively angularly movable about its axis for the purpose of simultaneously raising and lowering the arms. While such rotary or rocking movement of the shaft 61 may be achieved in any of various manners, one mode of accomplishing this is shown in the accompanying drawings, consisting of a worm gear unit generally designated 72, establishes an operative connection between the input or worm shaft 73 and the carriage shaft 61 to cause rotary movement of the shaft 61 and arms 59 and 60 incident to the rotation of the shaft 73. For rotating the worm gear shaft 73, there may be provided a suitable handwheel 75 or alternatively, and preferably in place of said handwheel, there may be employed a usual reversible electric gear motor connected in driven relation to the shaft 73 and selectively controllable to rotate said shaft in either direction to the desired extent. A more rapid and therefore preferred means for thus raising and lowering the members 59 and 60 is shown in FIGURE 4 consisting of a double acting air cylinder 175 having its base pivoted at 176 to a support arm 177 fixed to the frame of the carriage 40. Its piston rod has its free end pivoted at 173 to a crank arm 179 fixed on the lock shaft 61. Bars or stops 180 and 181 are fixed on the carriage frame in positions to arrest the movement of the arms or members 59 and 60 in accurately pre-determined raised and lowered positions.

Thus, in the operation of the invention, a supply of billets B, $B_1$, $B_2$, $B_3$, etc. is placed in the chute 31. The foremost of these billets B will roll by gravity into the positioner 30 as shown in FIGURES 1 and 2. The carriage 40, if not already in its retracted position, will be moved to such position by appropriate actuation of its pneumatic cylinder 50. In such position, it will be abreast of the positioner 30 with its gripping arms or members 59 and 60 normally raised above and clear of the billet B in said positioner. Having thus been retracted, the carriage will remain at rest, while through suitable actuation either of the worm gearing 72 of FIGURE 3, or of the pneumatic cylinder 175 of FIGURE 4, the arms or elements 59 and 60 will be swung downward angularly to be brought into alignment with, but spaced from the respectively opposite ends of the billet. Such spacing will be due to the fact that the arms 59 and 60 will have been spread apart through actuation of their pneumatic control 67 prior to return movement of the carriage in order to release a billet, which has been previously fed past the saw. However, once the arms are lowered to operative position, as indicated in full lines in FIGURES 2 and 3, the control cylinder 67 is actuated in a known manner to urge them towards each other and into gripping engagement with the opposite ends of the billet B. The control cylinder 50 may then be actuated to institute a feeding movement or stroke of the carriage, causing it thus to carry the billet B out of the positioner 30 and into operative cutting engagement with the saw 10. With the arrangement as thus described, the carriage and its gripping elements 59 and 60 will continue throughout the entire feeding stroke to support the billet B at a uniform level, with its axis in uniformly spaced parallel relation to the cutting plane of the saw. After the carriage has completed its feeding stroke past the saw 10, the gripping elements or members 59 and 60 will then be spread apart in obvious manner to release the billet B, following which the said members 59 and 60 are raised to their retracted positions. Then, through appropriate actuation of the cylinder 50, the carriage is returned to its retracted position in which the members 59 and 60 may be lowered and brought into engagement with the next following billet $B_1$, to repeat the operative cycle above described.

In this application, we have shown and described only the preferred embodiment of our invention. However, it will be readily apparent that the invention is capable of other embodiments and that its several details may be modified in various ways, all without departing from our invention as defined by the appended claims.

Having thus described our invention, we claim:

1. A woodworking machine for forming on a roughly cylindrical billet a plane surface substantially parallel to the cylindrical axis of said billet, comprising: a cutting tool disposed for cutting in a predetermined cutting plane, means supporting said tool for rectilinear adjustment perpendicular to its said cutting plane, a billet positioner fixedly supported on the infeed side of said tool for positioning a billet with its cylindrical axis parallel to said cutting plane, and with said plane chordally intersecting said billet, a magazine for feeding a plurality of billets in succession to said positioner, a feed carriage, means supporting said carriage for operative movement parallel to said cutting plane from a retracted position abreast of said positioner through a feed stroke past said tool and a return stroke, power means for moving said carriage through its feed and return strokes, gripping members carried by said carriage for operative movement into and from gripping engagement with the opposite axial ends of a billet supported in said positioner, for removing said billet from the positioner on the feed stroke of the carriage and fixedly supporting said billet in its axial position as determined by said positioner during movement of the carriage through its feed stroke, said gripping members being releasable from the billet at the end of said feed stroke for return with the carriage to its retracted position, said gripping members being mounted on the carriage for movement from an operative position in axial alignment with the ends of a billet in said positioner, to a retracted position out of axial alignment therewith, whereby to clear a billet operatively held in said positioner on the return stroke of said carriage.

2. A woodworking machine for forming on a roughly cylindrical billet a plane surface substantially parallel to the cylindrical axis of said billet, comprising: a cutting tool disposed for cutting in a predetermined cutting plane, a billet positioner fixedly supported on the infeed side of said tool for positioning a billet with its cylindrical axis parallel to said cutting plane, and with said plane chordally intersecting said billet, a magazine for feeding a plurality of billets in succession to said positioner, a feed carriage, means supporting said carriage for operative movement parallel to said cutting plane from a retracted position abreast of said positioner through a feed stroke past said tool and a return stroke, gripping members carried by said carriage for operative movement into and from gripping engagement with a billet supported in said positioner, for fixedly supporting said billet on the carriage during said feed stroke in its axial position with respect to said cutting plane as determined by said positioner, said gripping members being releasable from the billet at the end of said feed stroke for return with the carriage to its retracted position, said gripping members being mounted on the carriage for movement from an operative position in alignment with the ends of a billet in said positioner, to a retracted position out of alignment therewith, whereby to clear a billet operatively held in said positioner on the return stroke of said carriage.

References Cited in the file of this patent

UNITED STATES PATENTS

| | | |
|---|---|---|
| 2,673,581 | Dornath et al. | Mar. 30, 1954 |
| 2,803,272 | Crosby | Aug. 20, 1957 |
| 3,037,538 | Graham | June 5, 1962 |